United States Patent [19]

Koch

[11] Patent Number: 4,538,523
[45] Date of Patent: Sep. 3, 1985

[54] BELLOWS FOR ARTICULATED VEHICLES

[75] Inventor: Robert Koch, Bad Sooden-Allendorf, Fed. Rep. of Germany

[73] Assignee: Hubner Gummi-Und Kunstsoff GmbH, Kassel-Bettenhausen, Fed. Rep. of Germany

[21] Appl. No.: 401,198

[22] Filed: Jul. 23, 1982

[30] Foreign Application Priority Data

Jul. 31, 1981 [DE] Fed. Rep. of Germany ....... 3130361
Oct. 6, 1981 [DE] Fed. Rep. of Germany ....... 3139697

[51] Int. Cl.³ .............................................. B61D 17/20
[52] U.S. Cl. ..................................... 105/20; 105/8 R; 105/21; 410/100; 403/45
[58] Field of Search ...................... 105/8 R, 15, 18, 19, 105/20, 21; 403/43, 44, 45, 322, DIG. 7; 410/100, 103, 12; 24/68 CT, 68 CD, 68 D, 71 T, 71 ST, 115 G, 115 R, 134 R

[56] References Cited

U.S. PATENT DOCUMENTS

| 625,573 | 5/1899 | Leavitt | 24/71 A |
| 2,264,470 | 12/1941 | Bugatti | 105/8 R |
| 2,462,382 | 2/1949 | Gleason | 403/43 |
| 2,841,426 | 7/1958 | Schanke et al. | 403/44 |
| 3,494,641 | 2/1970 | Caregnato | 403/322 X |

Primary Examiner—Robert B. Reeves
Assistant Examiner—Glenn B. Foster
Attorney, Agent, or Firm—Alan H. Levine

[57] ABSTRACT

A bellows for use between two parts of a vehicle connected to each other by a pivot. Each of the facing ends of the vehicle parts, to which the bellows is connected, has a grooved formation extending in the circumferential direction of the bellows. Each end of the bellows carries a flexible but non-stretchable cable sized for accommodation within the grooved formation. In one version of the invention a cooperating toggle and turnbuckle arrangement interconnects the ends of the cable for tensioning the latter after it is placed in the grooved formation so as to attach the end of the bellows to one of the vehicle parts. In a second version the toggles are jointly operated by a common rotary disc.

4 Claims, 6 Drawing Figures

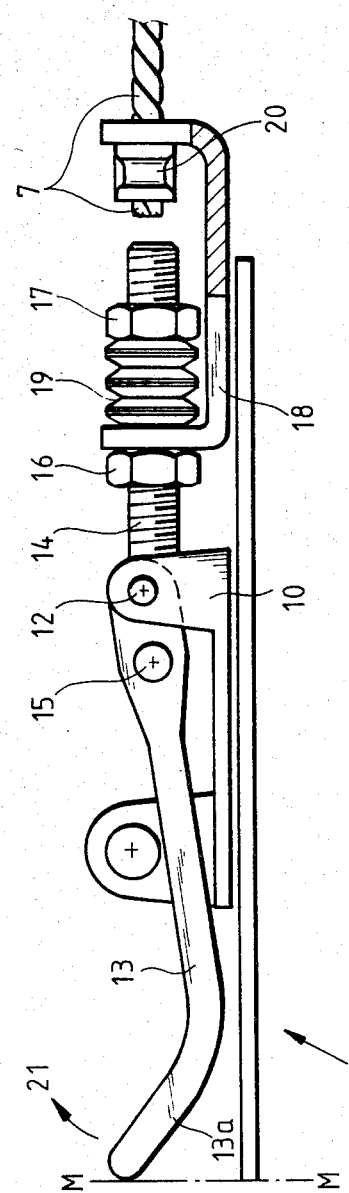
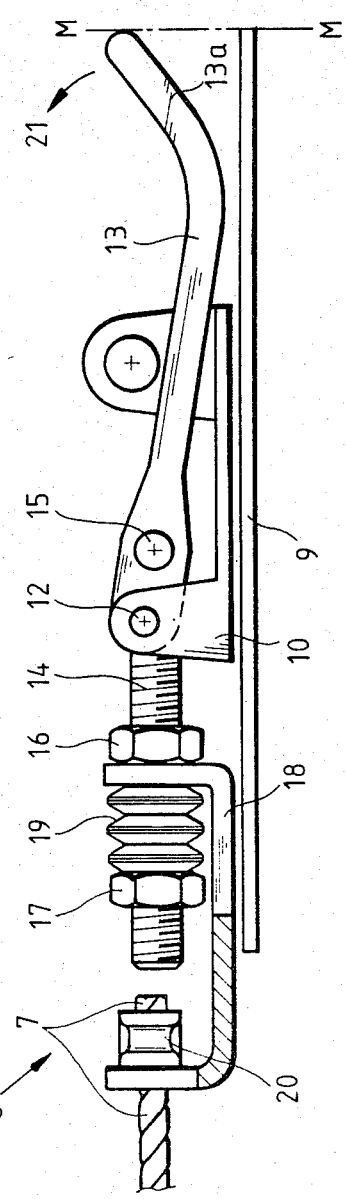
FIG. 3A
FIG. 3B

BELLOWS FOR ARTICULATED VEHICLES

This invention relates to a bellows, each end of which is connected to the face of a vehicle portion by means of a flexible cable carried by the bellows and accommodated within a groove-shaped frame presented by the end of the vehicle portion.

Such bellows are inserted between the two facing ends of two parts of a vehicle, such as an articulated bus, which are connected by a pivot, in order to form a tunnel-shaped enclosure around the bridge connecting these two parts of the vehicle, so that persons changing over from one part of the vehicle to the other across the connecting bridge, are protected from head wind, the inclemencies of the weather, and dust.

In particular, the invention relates to the attachment of such bellows to the two facing ends of the two parts of the vehicle. For this attachment, the wall of the vehicle is designed in the form of a groove and a profiled seal is inserted in this groove, which runs in the circumferential direction of the bellows. A bracing cable is sewn into the corresponding end of the bellows. The bracing cable lies in the groove of the vehicle wall and holds the bellows against the vehicle wall. In order to be able to attach the end of the bellows to, or to separate it from, the corresponding end part of the vehicle, the bracing cable must be flexible or it must be possible to vary the distance between the ends of the essentially inextensible bracing cable. In this connection, it is customary to use an essentially inextensible bracing cable, the two ends of which are connected to each other by a trunbuckle in the region of the lower, horizontal wall of the bellows.

If the turnbuckle is opened, the bellows can be taken out of the groove-shaped end of the vehicle wall, so that it is separated from that part of the vehicle. The turnbuckle consists of two threaded pins, the facing ends of which can be turned in different directions far into a coupling piece and the other ends of which are designed as holders for the respective ends of the bracing cable.

This device is technically perfect, and the costs of constructing it are justifiable. However, the effort involved in using it is frequently regarded as excessive, in spite of which, however, alternative solutions have not previously been offered.

An object of the invention is to provide a bellows, as defined above, which can be constructed without being significantly more expensive than known solutions and which is significantly easier to operate without loss in efficiency.

This object is accomplished by means of a combined turnbuckle and toggle arrangement for tensioning the cable.

The invention is described in greater detail below, with reference to the accompanying drawings. In the drawings:

FIGS. 3a and 3b show the turnbuckle of the invention; the parts of the turnbuckle located to the right of the centerline M—M are shown in FIG. 3a and those located to the left of the centerline in FIG. 3b.

Figures 1, 2:
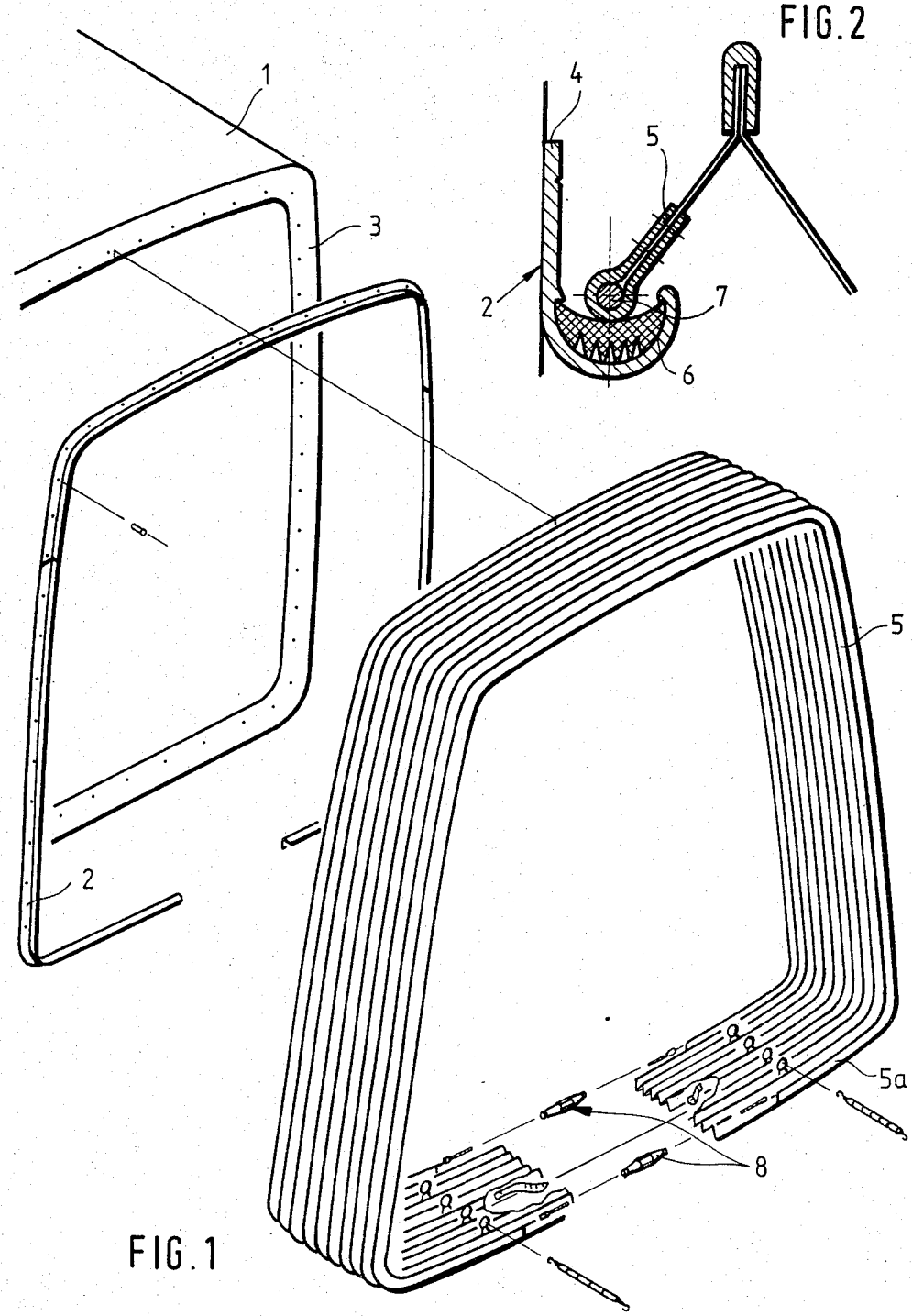
FIG. 1 is an exploded perspective view of a bellows according to the invention.
FIG. 2 is a cross-sectional representation of a particular feature of the bellows.

A rigid, circumferential frame 2 is attached to the rear, open end of a front part of a vehicle 1, for example, by being screwed to the rear end 3 of the front part of the vehicle 1 (FIG. 1). The frame 2 has a U-shaped cross section, the sides of the U being of unequal length (FIG. 2). The longer side 4 is used for screwing the frame 2 to the front end part of the vehicle. A bracing cable 7, which fits into the groove-shaped bed of the frame 2, is sewn into the end of the bellows 5. In order to produce a better seal, a rubber section 6 is inserted in the bed of the frame and secured therein. The bracing cable 7 rests on this rubber section in the bed of the frame when the bellows is connected. In order to hold the end of the bellows in frame 2, the bracing cable 7 is located under tension in the end cloth of the bellows in order to prevent the bellows from passing inadvertently beyond the shorter side of the U of frame 2. This tension is produced or removed, according to the invention, as follows. In this description, it is assumed that the two ends of the bellows are of the same design and that each end of a bellows is attached to an end of two successive parts of a vehicle.

In the region of the lower, horizontal bellows wall 5a, the two ends of the bracing cable 7 are connected to each other by a toggle turnbuckle 8. The toggle turnbuckle 8 is mounted on a base plate 9 (FIGS. 3a and 3b), which is held by two bearing brackets 10. Each bearing bracket 10 is provided with a bearing pin 12, extending in the longitudinal direction of the vehicle, on which one end of a lever 13 is mounted for pivotal movement. The other end of lever 13 is formed as a handle 13a, adapted to be activated manually. Between the two ends of lever 13, a coupling rod 14 is pivoted on a pin 15 of lever 13, the longitudinal axis of the pin extending parallel to the longitudinal axis of the bearing pin 12. At its end remote from the pivot, the coupling rod 14 has a threaded section on which two abutments in the form of nuts 16 and 17 are screwed, the nuts being spaced apart in the axial direction of the rod. One leg of a U-shaped coupling 18 is located between the two nuts 16 and 17, the nut 16, closer to the pivot of the coupling rod 14 on lever 13, being in direct contact with the outside of the leg of the coupling. A spring element, in the form of a plate spring 19, is arranged between the inside of this coupling leg and the nut 17, which is further removed from the pivot. To the other leg of the coupling 18, one end of the bracing cable 7 is attached by means of a collet 20.

In the operating position of the devide shown, the ends of the bracing cable are almost at the shortest possible distance from each other, so that the bellows is fixed relative to the end of the vehicle. The levers 13 and their handles 13a are folded against the base plate 9. The distance of pin 15 from base plate 9 is somewhat less than its distance from bearing pin 12. In order to dismantle the bellows, lever 13 is pivoted about bearing pin 12 in the direction of the arrows 21. In so doing, the springs 19 are initially stressed more, until pins 12 and 15 and springs 19 lie in a plane parallel to the base plate 9. As lever 13 is pivoted further, the tension on spring 19 is relieved, so that the distance between the ends of the bracing cable 7 increases and the end of the bellows can be pushed over the end frame.

The device is therefore simple to operate, simple in construction, and reliable in operation. The operation is simple because the levers 13 can be moved only in one of two directions, and because a greater change in the distance between the ends of the bracing cable can be achieved by means of the two levers. Because of the possibility of altering the distance between the two ends of the bracing cable, the end of the bellows can be fixed reliably in a relatively deep groove of the connecting frame. It is also to the advantage of operational reliability that, on pivoting the lever 13 between its end positions, it is necessary to pivot it through the point at which the spring is subjected to the maximum tension.

By altering the relative positions of the nuts 16 and 17, the pretension in springs 19 can be altered, so that the tension with which the respective bracing cable is held in the groove of the end of the frame 2 is changed. By similarly displacing the nuts 16 and 17 relative to the threaded pin 14, the effective basic length of the bracing cable can be altered. In this connection, it is advisable to distribute such changes uniformly over both parts of the tentioning device, which preferably are provided.

The plane in which the tensioning levers 13 are pivoted, as indicated by arrows 21, is a plane parallel to the lower horizontal wall 5a of the bellows, the tensioning levers 13 lying below eyelets 10, so that these eyelets can be engaged from one side by the bellows and so that the tensioning lever can be pivoted below them.

A further simplification of the tensioning mechanism is offered by a modification of the previously described mechanism.

Whereas in the previously described solution the two turnbuckles were separately operated, the modified solution provides that both toggles can be simultaneously operated with one common operating mechanism.

It is in fact possible to operate the turnbuckles together with both toggles with a single manipulation. The bellows can therefore be tensioned or slackened, at both ends with one manipulation.

A rotary disc, to which the opposing ends of both toggles are coupled, serves as a simple and reliable in service, means of jointly operating both toggles, in preferance to the two turnbuckles.

To increase the aspect of safety, the two toggles should be so connected to the disc, that the relationship between them, and the coupling points of the cable lie over dead center.

The realisation of this principle relies on the toggles being of circular arc form, and that both ends of a tensioning cable, fed through guiding blocks are connected to their corresponding ends.

Finally, so that the mechanism is of simple construction, the rotation of the disc should be manipulated by means of applying a socket wrench to the polyhedral spigot (i.e. a hexagonal nut) on its upper face.

Figure 4:
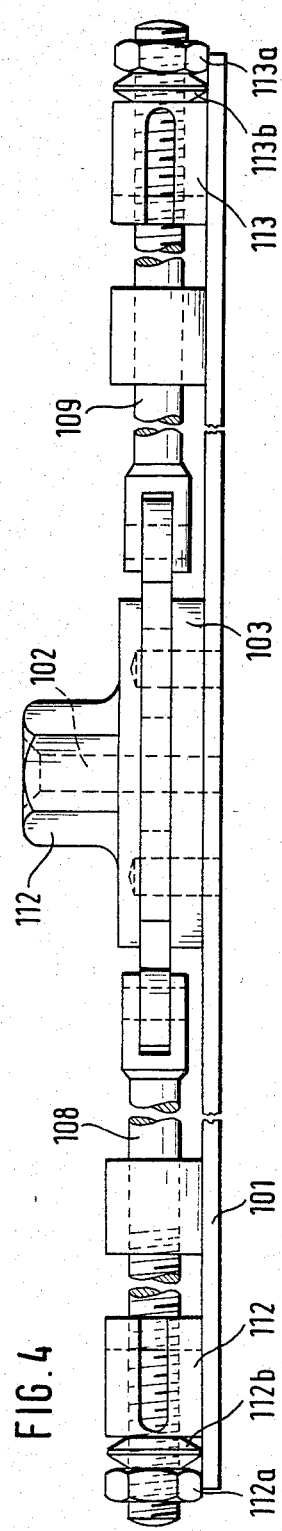
FIG. 4 shows in side view a further modification to the tensioning mechanism of the invention.
Figure 5:
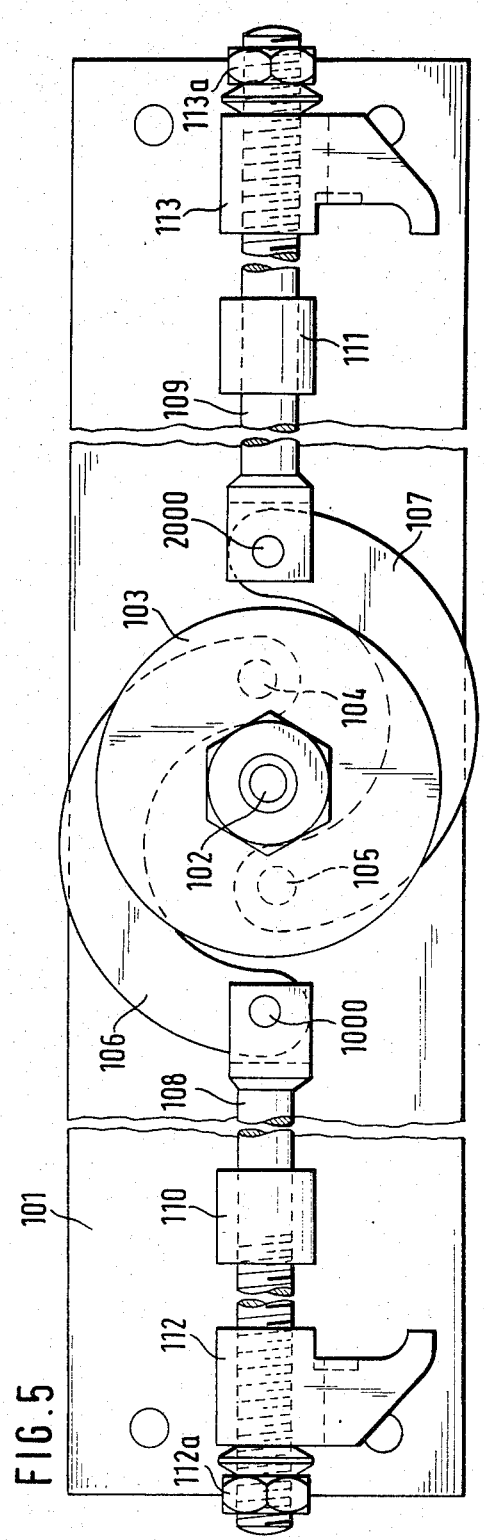
FIG. 5 shows the same mechanism in plan view, whereby the mechanism parts in FIGS. 4 and 5 labelled with "a" are located to the left of the center line A—A, and those labelled with "b" are located to the right of the center line A—A.

A disc 103 is rotatable about its longitudinal axis by means of a vertical pivot 102 fixed on a base plate 101 (FIGS. 4 and 5). Two opposingly placed, arc-formed toggles are coupled with the pivots 104, 105, to the disc 103. The outer ends of the toggles 106, 107 are coupled with a pivot pin 1000 respectively 2000, to each of the tensioning bolts 108, 109. The tensioning bolts are adjustable in the direction of their longitudinal axis, each being fixed to the base plate 101 in a locating block 110 respectively 111.

The outer ends of both tensioning bolts are axially adjustable with a nut, that holds a radially sprung, slotted cable hook 112, respectively 113 in place.

The tensioning cable, for the purpose of tensioning and fixing the bellows the vehicle ends, is hooked at both ends into the cable hooks. A lead filled nipple-type cable end seats in the saddle-formed profile of the hook.

In the shown position of the disc 103, the pivot points 105, 2000 and 104, 1000 lie on opposing sides of the central pivot 102, the distance between the pivot points 1000 and 2000, subsequently the cable ends, being minimal, the cable is tensioned and drawn through the edge of the bellows, which are seated in a circumferential groove on the vehicle; in this way the bellows are held in place.

To open the latch, and accordingly lengthen the tensioning cable, the disc 103 in the represented working position must be rotated so that the pivot points 104, 1000 move to one side of the central pivot 102, and that 105, 2000 move to its other side. The distance between the pivot points 1000 and 2000, subsequently the ends of the cable, is therefore greater. The cable can then be taken out of the groove on the wall of the vehicle, the bellows can then be separated from the vehicle.

In the represented working position, the pivot points 1000, 2000 lie in a straight line, in the same axis as the longitudinal axis of the tensioning bolts 108, 109, whereas the pivot points 104, 105 lie either side of this line. When the disc is rotated into the locked position, whereby the pivot points 104, 105 move across this center axis over their dead-centers providing a secure fixing of the shown working position.

The rotation of the disc 103 is achieved by the manipulation of the integral polyhedral spigot (in this case a hexagonal nut) with a socket wrench.

It would be practical to locate spring washers i.e. plate springs 112b, 113b between the cable hooks 112, 113 and their appertaining locknuts 112a, 113a. So as to alter the pressure on the tensioning cable within limits, or to hinder the cable hooks unintentionally lifting away from the locknuts, and also to maintain a relative degree of freedom when tightening the locknut and especially to be able to compensate for shrinkages of the vehicle, bellows and tensioning cable under extreme differences in temperature.

The invention has been shown and described in preferred forms only, and by way of examples and many variations may be made in the invention which will still be comprised within its spirit. It is understood, therefore, that the invention is not limited to any specific form or embodiment except insofar as such limitations are included in the appended claims.

I claim:

1. For use with a bellows employed between the opposed end faces of two pivotally interconnected vehicle sections, each end face having a groove extending substantially circumferentially around it, the bellows including at each of its ends a flexible but non-stretchable cable extending circumferentially around the bellows, the cable being sized to be accommodated within one of the grooves:

means for tensioning the cable after it is placed in the groove so as to attach the end of the bellows to one of the vehicle sections, the tensioning means comprising:

(a) a base plate,